United States Patent [19]
White

[11] Patent Number: 5,033,019
[45] Date of Patent: Jul. 16, 1991

[54] VERY-HIGH-SPEED FREQUENCY-DOMAIN FFT WINDOWING DEVICE

[75] Inventor: Stanley A. White, San Clemente, Calif.

[73] Assignee: Rockwell International Corporation, El Segundo, Calif.

[21] Appl. No.: 439,901

[22] Filed: Nov. 21, 1989

Related U.S. Application Data

[63] Continuation of Ser. No. 166,284, Mar. 10, 1988.

[51] Int. Cl.$^5$ .............................................. G06F 15/332
[52] U.S. Cl. ................................ 364/726; 364/724.18
[58] Field of Search ............................ 364/726, 724.18

[56] References Cited

U.S. PATENT DOCUMENTS 4,231,103 10/1980 Timm .................................. 364/726

OTHER PUBLICATIONS

Nussbaumer, "Efficient Implementation of Convolutions & Discrete Transforms Using Polynomial Transforms & Distributed Arithmetic", *IBM Tech. Disclosure Bulletin* vol. 2, No. 6, Nov. '78, pp. 2374–2375.

Liv et al., "A New Hardware Realization of high-Speed Fast Fourier Transformers", *IEEE Trans. on Acoustics, Speech & Signal Processing* vol. ASSP-23, No. 6, Dec. '75, pp. 543–547.

Chow et al., "A Pipelined Distributed Arithmetic PEFT Processor", *IEEE Trans. on Computers* C-32, No. 12 Dec. '83, pp. 1128–1136.

Kaiser et al., "On the Use of the $I_0$-Sinh Window for Spectrum Analysis", *IEEE Trans. on Acoustics, Speech & Signal Processsing* vol. ASSP-28, No. 1, Feb. '80, pp. 105–107.

Harris, "On the Use of Windows for Harmonic Analysis with the Discrete Fourier Transform", *Proceeding of the IEEE* vol.-66, No. 1, Jan. '78, pp. 51–83.

*Primary Examiner*—David H. Malzahn
*Attorney, Agent, or Firm*—H. Fredrick Hamann; George A. Montanye; David J. Arthur

[57] ABSTRACT

A frequency-domain Fast Fourier Transform windowing device includes a plurality of input lines, each of which is coupled to a corresponding frequency bin output line of an FFT; and a memory. The memory includes address input ports connected to the input lines and an output line. The memory reads out onto the output line values read out from the locations in the memory corresponding to signals received at the address input ports. The memory has stored in it values corresponding to the coneolution of samples on several of the input lines and the corresponding predetermined weighting coefficients.

18 Claims, 8 Drawing Sheets

VERY-HIGH-SPEED FREQUENCY-DOMAIN FFT WINDOWING DEVICE

This is a continuation of co-pending application Ser. No. 07/166,284, filed on March 10, 1988.

BACKGROUND OF THE INVENTION

Spectrum analysis is performed on many types of digital signals in a variety of applications. A Fast Fourier Transform (FFT) is typically used in such spectrum analysis to convert a time-domain digital signal to a frequency-domain signal. Nevertheless, the FFT by itself is generally inadequate to perform spectrum analysis because of artifacts introduced by the finite length of the digital-signal data record.

Those artifacts are controlled by "windowing" the signal. In the time-domain, windowing is performed by multiplying each input sample by a suitable time-domain weighting coefficient. This is illustrated by the assembly shown in FIG. 1, in which a multiplier 11 is connected to each (time-domain) input line 13 to the FFT 15. In the frequency-domain, the windowing is performed by convolving the FFT outputs with suitable frequency-domain weighting coefficients. The frequency-domain weighting coefficients are the Fourier transform samples of the time-domain weighting coefficients. FIG. 2 shows an FFT assembly with convolvers 21 on the (frequency-domain) output lines 23 of the FFT 25.

Generally, the choice of whether to window in the frequency-domain or in the time-domain is driven by both applications and mechanization considerations. In many applications, the input-data signal is too fast to permit time-domain windowing. However, because of the extremely large number of computations required for frequency-domain windowing, that method has also proved inadequate for extremely high-speed-data inputs. Additionally, the large processors required for the frequency-domain windowing has further limited the applications in which such windowing can be practically carried out.

SUMMARY OF THE INVENTION

The present invention is a device for extremely high speed windowing in the frequency-domain of the output of an FFT. The invention uses distributed arithmetic to perform the convolution calculations.

The frequency-domain fast Fourier transform device includes input lines, each corresponding to an FFT output frequency bin. A memory has its address input ports connected to the input lines and has an output line for outputting values read out from locations in the memory corresponding to signals received at the address input ports. The memory has stored in it values corresponding to the convolution of samples on several of the input lines and the corresponding predetermined weighting coefficients.

The apparatus stores the partial products of the windowing function in table-lookup memories. The table-lookup memories are addressed by the FFT output and the averages of pairs of adjacent outputs of the FFT. Several of the FFT outputs may be concurrently used in different window operators, reducing the required number of input lines, to simplify hardware connections, and to reduce the required number of signal pins.

DETAILED DESCRIPTION OF THE PREFERRED EMBODIMENTS

Figure 1:
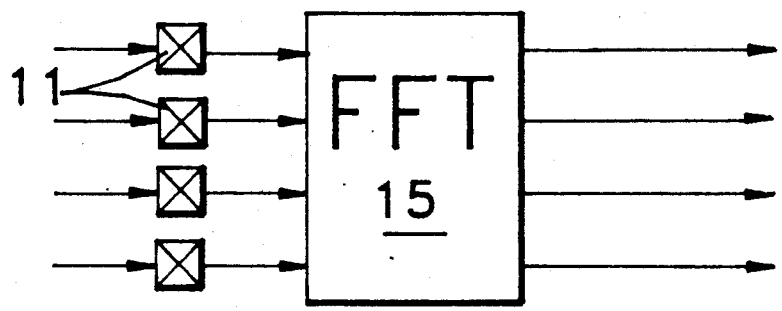
FIG. 1 is a block diagram of an FFT with time-domain windowing on the FFT inputs.
Figure 2:
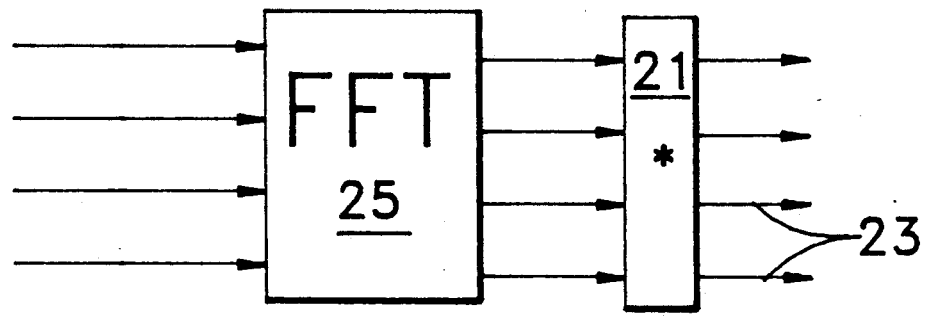
FIG. 2 is a block diagram of an FFT with frequency-domain windowing on the FFT outputs.

A common time-domain windowing technique is the Blackman-Harris window, described in Harris, "On the Use of Windows for Harmonic Analysis with the Discrete Fourier Transform," *Proceedings of the IEEE*, Vol. 66, No. 1, January 1978, pages 51–83. The Blackman-Harris window provides specified weighting coefficients w(m). The coefficient w(m) is to multiply with the mth input sample of the input-data sequence. Both the real and imaginary components of each input sample must be multiplied. The coefficients $w_m$ are chosen for the desired frequency-bin shaping features.

The four term Blackman-Harris window closely approximates a Kaiser-Bessel window. The Kaiser-Bessel window approximates prolate-spheroidal wave functions of order zero, which for restricted energy and a stated time interval will maximize energy in a band of frequencies. But, the frequency-domain implementation of the Kaiser-Bessel window does not exist. The similarity between the Blackman-Harris window and the Kaiser-Bessel window provides a design bridge between time-domain windowing and frequency-domain windowing. Using the transform of the Blackman-Harris in frequency-domain windowing will then closely resemble use of the Kaiser-Bessel window.

The four term Blackman-Harris window is here used as an example. Application of the invention to the three term Blackman-Harris window and others will be apparent to those skilled in the art.

In the time-domain the four-term Blackman-Harris window is defined as:

$$w(m) = a_0 - a_1 \cos\left(\frac{2pi}{N} m\right) + a_2 \cos\left(\frac{2pi}{N} 2m\right) - \quad (1)$$

$$a_3 \cos\left(\frac{2pi}{N} 3m\right)$$

Pursuant to the Blackman-Harris window, a related parameter (alpha) may be based upon the required shaping of the frequency bins. The parameter alpha is linearly related to the time-bandwidth product, and is the tradeoff between the sidelobe level and the main-lobe width. Such performance parameters are described in Kaiser and Schafer, "On the Use of the $I_O$-sinh Window for Spectrum Analysis", *IEEE Transactions on Acoustics, Speech, and Signal Processing*, Vol. ASSP-28, No. 1, February 1980, pages 105-107. The corresponding values of the coefficients $w_m$ for the Blackman-Harris window may be computed using the parameter alpha.

An additional factor $b_m$ may be defined:

$$b_m = \frac{\sinh[pi\sqrt{(alpha)^2 - m^2}]}{pi\sqrt{(alpha)^2 - m^2}} \quad (2)$$

$$c = b_0 + 2b_1 + 2b_2(+2b_3) \quad (3)$$

Therefore:

$$a_0 = b_0/c$$

$$a_m = 2b_m/c \quad m = 1, 2, (3) \quad (4)$$

The Discrete Fourier Transform (DFT) of the Blackman-Harris window [W (theta)] is computed based on the Dirichlet kernel, which is the DFT of an N-sample rectangular time window [D (theta)]:

$$W(\text{theta}) = a_0 D(\text{theta}) - \frac{a_1}{2}\left[D\left(\text{theta} - \frac{2pi}{N}\right) + D\left(\text{theta} + \frac{2pi}{N}\right)\right] + \frac{a_2}{2}\left[D\left(\text{theta} - \frac{4pi}{N}\right) + D\left(\text{theta} + \frac{4pi}{N}\right)\right] - \frac{a_3}{2}\left[D\left(\text{theta} - \frac{6pi}{N}\right) + D\left(\text{theta} + \frac{6pi}{N}\right)\right] \quad (5)$$

The DFT of an N-sample rectangular time window in the absence of intentional window weighting (Dirichlet kerne) is:

$$D(\text{theta}) = \int_{-\infty}^{\infty} \sum_{m=0}^{N-1} \delta(t-m)e^{-j(\text{theta})t} dt \quad (6)$$

$$D(\text{theta}) = \sum_{m=0}^{N-1} e^{-j(\text{theta})m} \quad (7)$$

$$D(\text{theta}) = \frac{1 - e^{-j(\text{theta})N}}{1 - e^{-j(\text{theta})}} \quad (8)$$

$$D(\text{theta}) = \frac{e^{-j(\text{theta})N/2}}{e^{-j(\text{theta})/2}} \cdot \frac{e^{j(\text{theta})N/2} - e^{-j(\text{theta})N/2}}{e^{j(\text{theta})/2} - e^{-j(\text{theta})/2}} \quad (9)$$

$$D(\text{theta}) = [e^{-j((\text{theta})/2)(N-1)}] \frac{\sin((\text{theta})N/2)}{\sin((\text{theta})/2)} \quad (10)$$

Window Operator Mechanization

Figure 3:
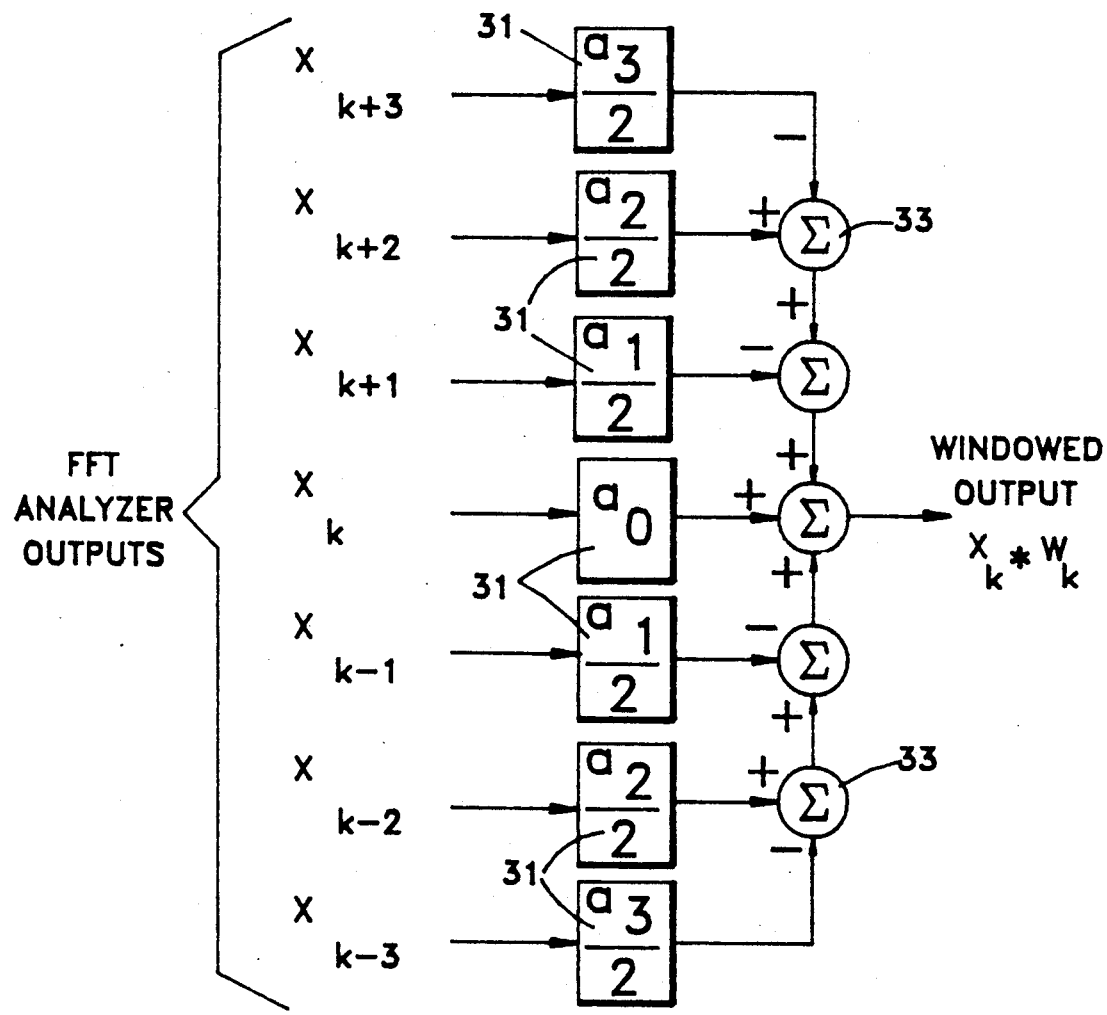
FIG. 3 is a block diagram of a frequency-domain windowing device for applying the transform of any 4-term integral-shift Dirichlet's-window function (e.g. the Blackman-Harris window) to an FFT output.

FIG. 3 illustrates how the frequency-domain-window function W (theta) might be directly mechanized for windowing the FFT output $X_k$. The FFT outputs are the inputs to the windowing device.

To provide windowing for a given frequency bin (FFT output) $X_k$, the three frequency bins on either side of the bin $X_k$ are involved, for a total of seven bins. In addition to the FFT output $X_k$, the outputs $X_{k-3}$, $X_{k-2}$, $X_{k-1}$, $X_{k+1}$, $X_{k+2}$, and $X_{k+3}$ are applied to multipliers for multiplication by the appropriate bin coefficient. The outputs of the multipliers are combined in adders 33 to obtain the windowed output $X_k{}^*W_k$. As each FFT output is a complex number, a total of $7 \times 2 = 14$ (real and imaginary) multiplications and $6 \times 2 = 12$ additions per epoch are required to perform the windowing function for each frequency bin.

The present invention implements the windowing function with the use of distributed arithmetic, including multiplication lookup tables. One of the significant advantages of the invention is that additional outputs may be obtained with minimal additional system complexity. The implementation of the invention also allows extremely high-speed operation for high-speed spectrum analysis.

Figure 4:
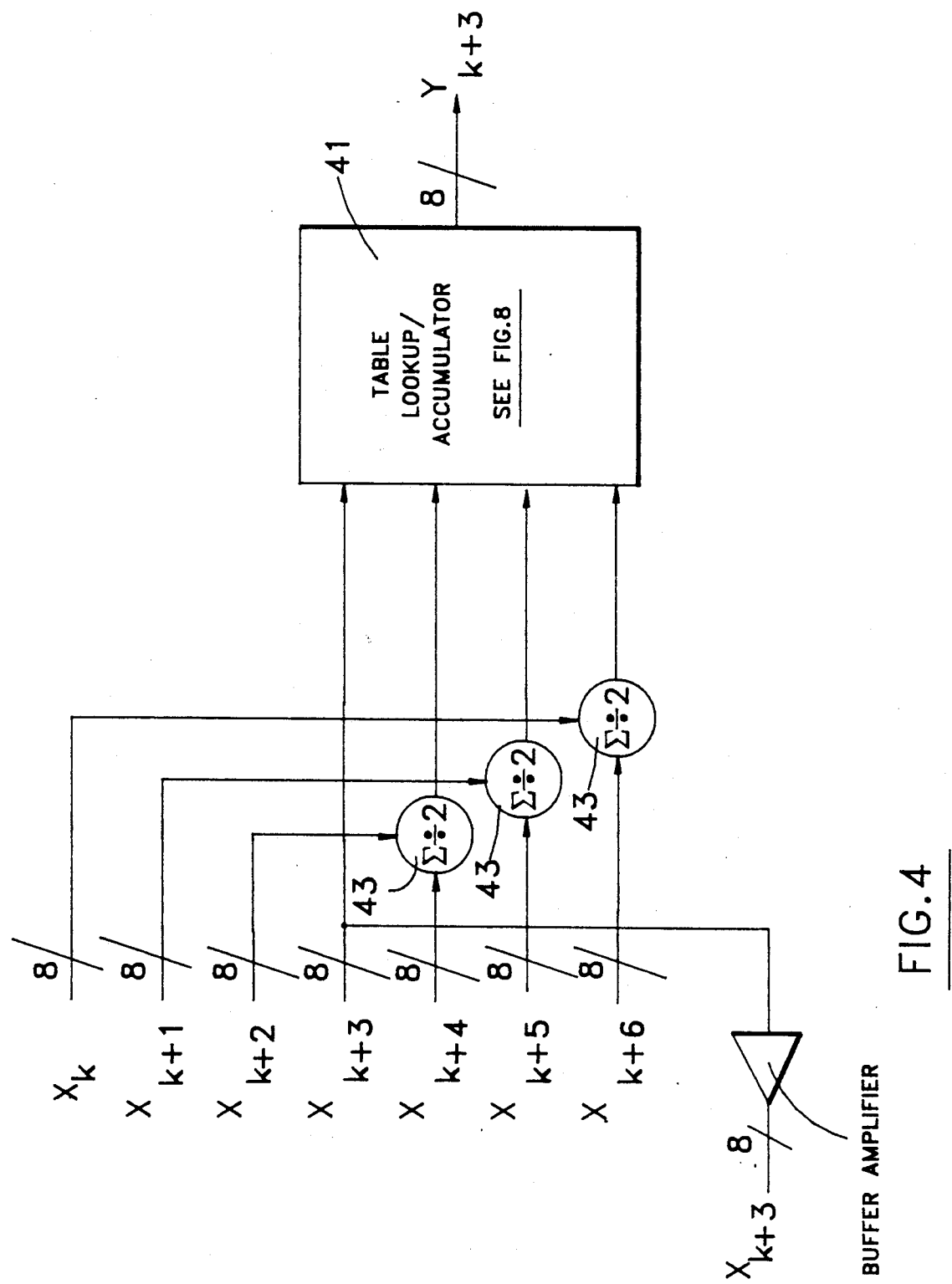
FIG. 4 is a block diagram of a single frequency-domain window operator constructed according to the invention.

A single window operator is shown in FIG. 4 for windowing the FFT output $X_{k+3}$. Seven FFT outputs $X_k$ through $X_{k+6}$ form the inputs to the window operator. The primary input is $X_{k+3}$ for this window operator whose output is $Y_{k+3} = X_{k+3}{}^*W_{k+3}$. As shown above, the adjacent six FFT outputs are used to perform the windowing function.

In the illustrated example, each FFT output is processed four bits at a time (4BAAT). As each FFT output/window operator input is a complex number having both real and imaginary parts, each window operator input is eight lines wide. The real and imaginary components are each sixteen bits in length. Thus, processing each FFT output sample takes four clock periods.

As shown, the FFT output channel $X_{k+3}$ is connected directly to a table lookup apparatus 41 so the "raw" output signal $X_{k+3}$ is applied to the distributed-arithmetic table lookup apparatus 41. Pairs of adjacent FFT output channels on either side of the output channel being windowed are input to averagers 43 for averaging their signals. The averaged signals are also applied to the table lookup device 41. These channels may carry the buffered output signals from their respective window operators. As shown, the FFT output signal $X_{k+3}$ is buffered in a delay element 45 so that it may be used in other window operators for others of the FFT outputs.

The adjacent operator inputs drive complex adder-dividers 43 to pair and average input samples equally spaced on either side of the primary input sample being windowed. The complex adder-dividers are shown in more detail in FIG. 7. Thus, for the illustrated operator for the input-channel $X_{k+3}$, the input-channel signals $X_{k+2}$ and $X_{k+4}$ are paired and averaged in a complex adder-divider 43, and the output of that adder-divider is applied to the table lookup/memory multiplier circuit accumulator 41. Similarly, the window inputs $X_{k+1}$ and $X_{k+5}$ are paired and averaged and applied to the memory accumulator 41, as are the outputs $X_k$ and $X_{k+6}$.

Complex Adder-Divider

Figure 7:
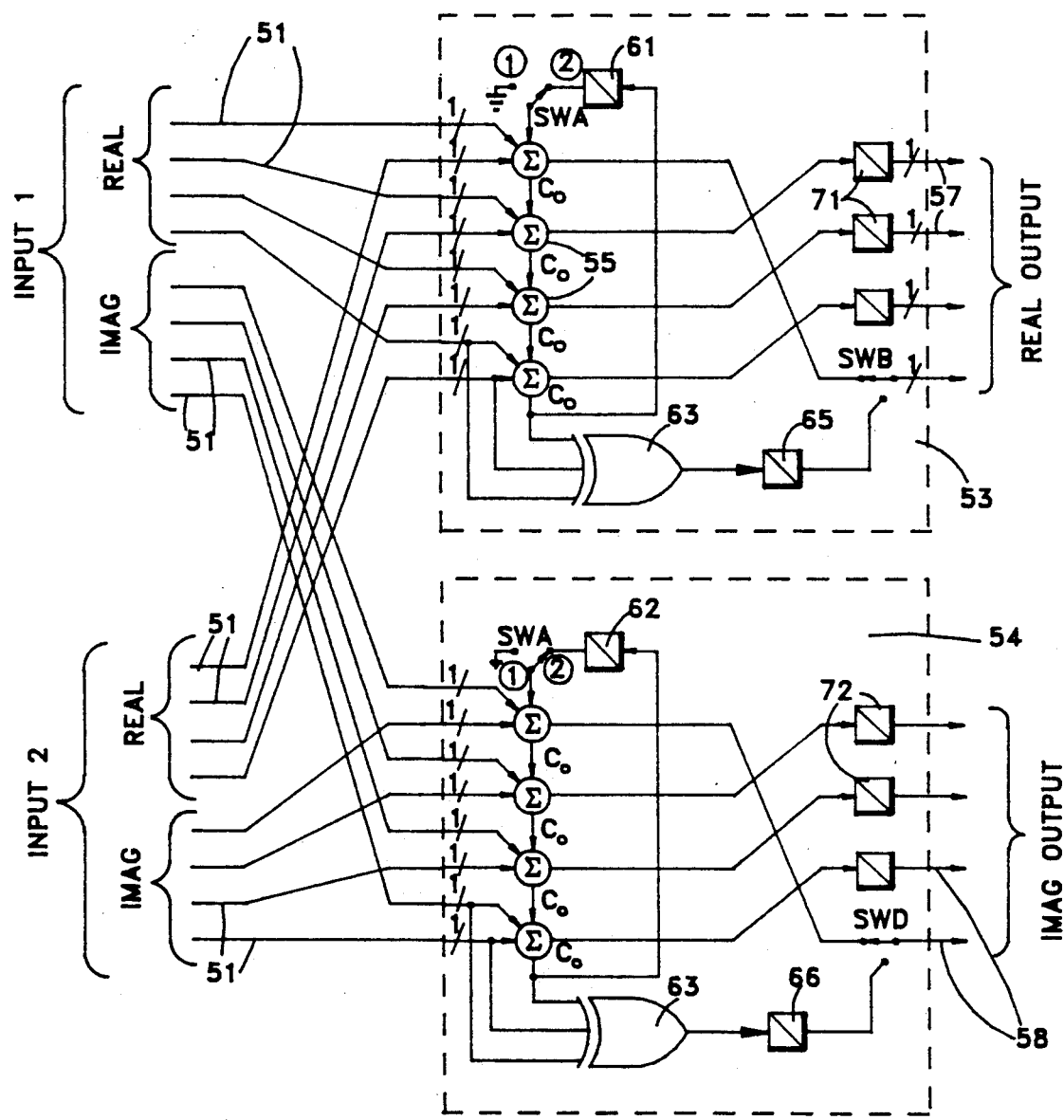
FIG. 7 is a block diagram of a complex adder-divider for the window operators shown in FIGS. 4, 5, and 6.

Referring now to FIG. 7, an example of a complex adder-divider such as may be used to average the adjacent pairs of secondary FFT outputs/window operator inputs is shown. In this illustrated embodiment, each input is a complex number having 8 bits, including 4 "real" bits and 4 "imaginary" bits. Four clock periods are therefore required to input the full 16 bits real and 16 bits imaginary of each input word. Each input line 51 is therefore one bit wide. The corresponding bits from each of the two inputs are added in parallel adders 53, 54. The upper adder 53 in FIG. 7 combines the real portions of the input signals, while the lower adder 54 combines the imaginary portions. Each adder 53, 54 includes a plurality of single bit adders 55, 56.

Those skilled in the art will recognize the remainder of the circuitry relating to bit overflow and to the division of the resulting bits to obtain real and imaginary outputs on the output lines 57, 58 as one-half the sum of the inputs one the input lines 51. A sixteen-bit, four-bit-at-a-time input from the FFT has the least-significant four bits applied first, and the most-significant bits last. In the illustrated adder-divider, the least-significant bit of each group of four is input on the top line, and the most-significant bit of each group is on the bottom line. Each bit summer 55, 56, combines the bits of corresponding significance.

The overflow from each bit summer 55, 56 is carried to the next bit summer. Any overflow from the most-significant bit adder is delayed in a buffer 61, 62 and applied to the least-significant bit adder 55, 56 during processing of the next most-significant set of four bits during the next clock period. When the most-significant set of four bits is being processed, overflow from the most-significant bit adder is input to logic 63, 64, delayed in a buffer 65, 66, and applied as the most-significant bit in the output.

During the processing of the least-significant four bits there is no overflow from a preceding addition, so the overflow-return switch SWA is in position 1, connecting the first-bit summer overflow input to ground. During processing of the other sets of bits the overflow-return switch SWA is in position 2 to feed the delayed overflow into the first-bit summer.

During the processing of the least-significant four bits of a sixteen-bit value the adder output switch SWB is set to position 1 so the overflow from the most-significant-bit addition of the previous set of bits is output as part of the previous processing, with the other bits that were delayed in output buffers 71, 72 for this purpose. The least-significant bit of the new calculation is dropped. When the second and subsequent sets of bits are processed, the output switch SWB is set in position 2 so the new LSB becomes the MSB of the preceding set of bits, as they are delayed in the output buffers 71, 72. In this way, the adder-divider simultaneously adds and divides by two to obtain the average of the two inputs.

The upper adder produces four-bit-wide real outputs while the lower adder produces four-bit-wide imaginary outputs so that each proceeds four bits at a time.

Multiplier/Accumulator

Figure 8:
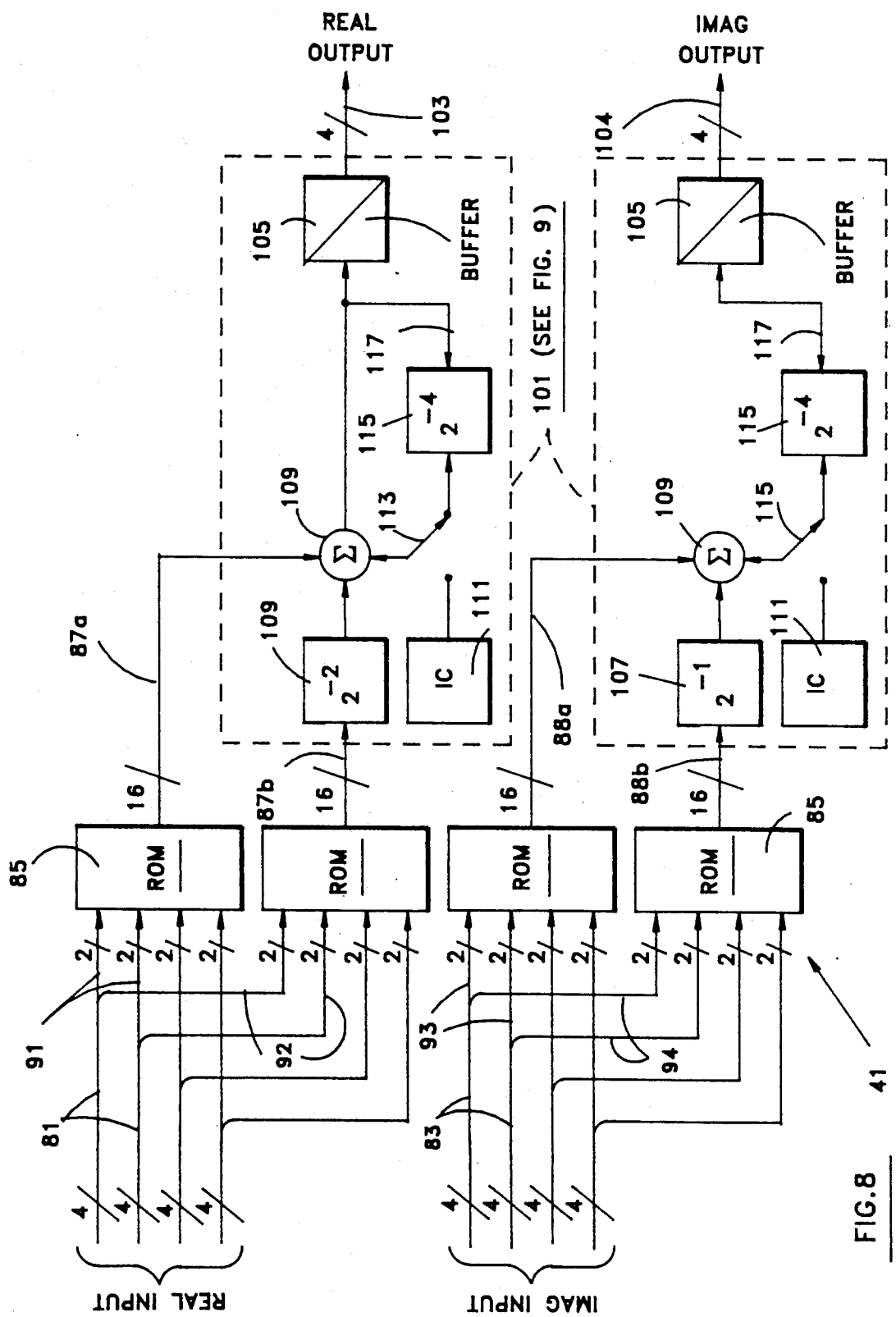
FIG. 8 is the partial-product table lookups and accumulators for the window operators shown in FIGS. 4, 5, and 6.

As shown in FIG. 4, the eight bit (four-bit real, four-bit imaginary) output of each adder-divider 43 and the eight-bit FFT output $X_{k+3}$ driving the window operator are applied to a multiplier/accumulator circuit 41, an example of which is illustrated in FIG. 8.

Referring now to FIG. 8, the multiplier/accumulator circuit for the partial products using distributed arithmetic is shown. The multiplier/accumulator circuit includes inputs for the real portion and the imaginary portion of the signal on each input channel. One input-bus line for each of the imaginary and real inputs is connected to the FFT output for the frequency bin being analyzed, while the other three are coupled to the outputs of the complex adder-dividers 43 that average adjacent FFT outputs.

In the embodiment shown, each real-input line 81 and each imaginary-input -lines 83 is 4 bits wide. These input lines are connected to the address input ports of identical memories 85, which use distributed arithmetic to provide an output on each memory output line 87, 88 appropriate for the address provided on the input line 81, 83. Each memory 85 stores the partial products for its address inputs, so that each input causes the partial product stored at that address to be read out.

The address input signal are in two's-complement format. Each memory location has a sixteen-bit partial product, including fifteen bits of magnitude and a sign bit, so the output of the memory is in signed-magnitude format.

As is known in distributed arithmetic, the memory devices can be made significantly smaller by splitting each four-bit input line 81, 83 into two-bit lines 91, 92, 93, 94 carrying the two most-significant bits and two least-significant bits, to address four separate memories. Although this doubles the number of memory devices required, it greatly reduces the size of memories required.

For a lookup table having a input variables and b bits per variable, a direct distributed-arithmetic mechanization requires a table-lookup memory of $2^{(ab-1)}$ words. The illustrated example has four real inputs 81, each consisting of four bits. A single memory addressed by four 4-bit words requires a $2^{((4)(4)-1)} = 2^{15}$ word storage. If each input is only two bits, the memory required is only $2^{((4)(2)-1)} = 2^7$ words, but two of such memories are required. Nevertheless, two memories, each with a capacity of 128 words is significantly easier to mechanize than a single memory of 32,768 words.

In the example shown, the outputs of the memories are each 16 bits wide. Thus, the memory-output lines 87, 88 are 16 bits wide. As the lookup-table memories are addressed over four time periods, those outputs are combined and accumulated in an accumulator loop 101, and then output as the real output on the real-output line 103 and the imaginary output on the imaginary-output line 104 of the window operator, $Y_{k+3}$ (see FIG. 4). In the illustrated embodiment, the real and imaginary output lines 103, 104 are each four bits wide, to output the windowed output eight bits at a time (four real, four imaginary). This may be accomplished through the use of a one-word buffer 105 on the output of each accumulator as shown Alternatively, each real and imaginary output line could be sixteen bits wide to output the entire value as a single parallel word.

As the embodiment shown uses two lookup-table RAMs 85 for each of the real input and the imaginary input, the outptus of the two RAMs associated with the real inputs must be combined to produce the real output, and the outputs of the two RAMs associated with the imaginary inputs must be combined to produce the imaginary output. Thus, the sixteen-bit output of the RAM addressed by the two least-significant bits of each input is scaled by the factor $2^{-2}$ in a factor element 107, and then combined in a summer 109 with the sixteen-bit output of the RAM addressed by the most-significant bits.

As the address input is received four bits at a time, the table-lookup circuit takes four clock periods to compute a sixteen-bit output. During the first clock period, when the least-significant four bits of each real and imaginary input are being processed, the accumulator-feedback switch 113 is set to pick up an initial-condition value from an initial condition register 111 and combine that with the output of the two table-lookup multiplication memories. During the second and subsequent clock periods of each epoch time the accumulator feedback switch 113 is in the position shown in FIG. 8 to receive the accumulator output from the previous clock period. As the values are processed least-significant-bits first, a scale-factor element 115 of $2^{-4}$ is included in the feedback loop 117.

The one-word (16 bit) buffer 105 on the output allows the output to be passed on four bits at a time for each of the real and imaginary portions.

Figure 9:
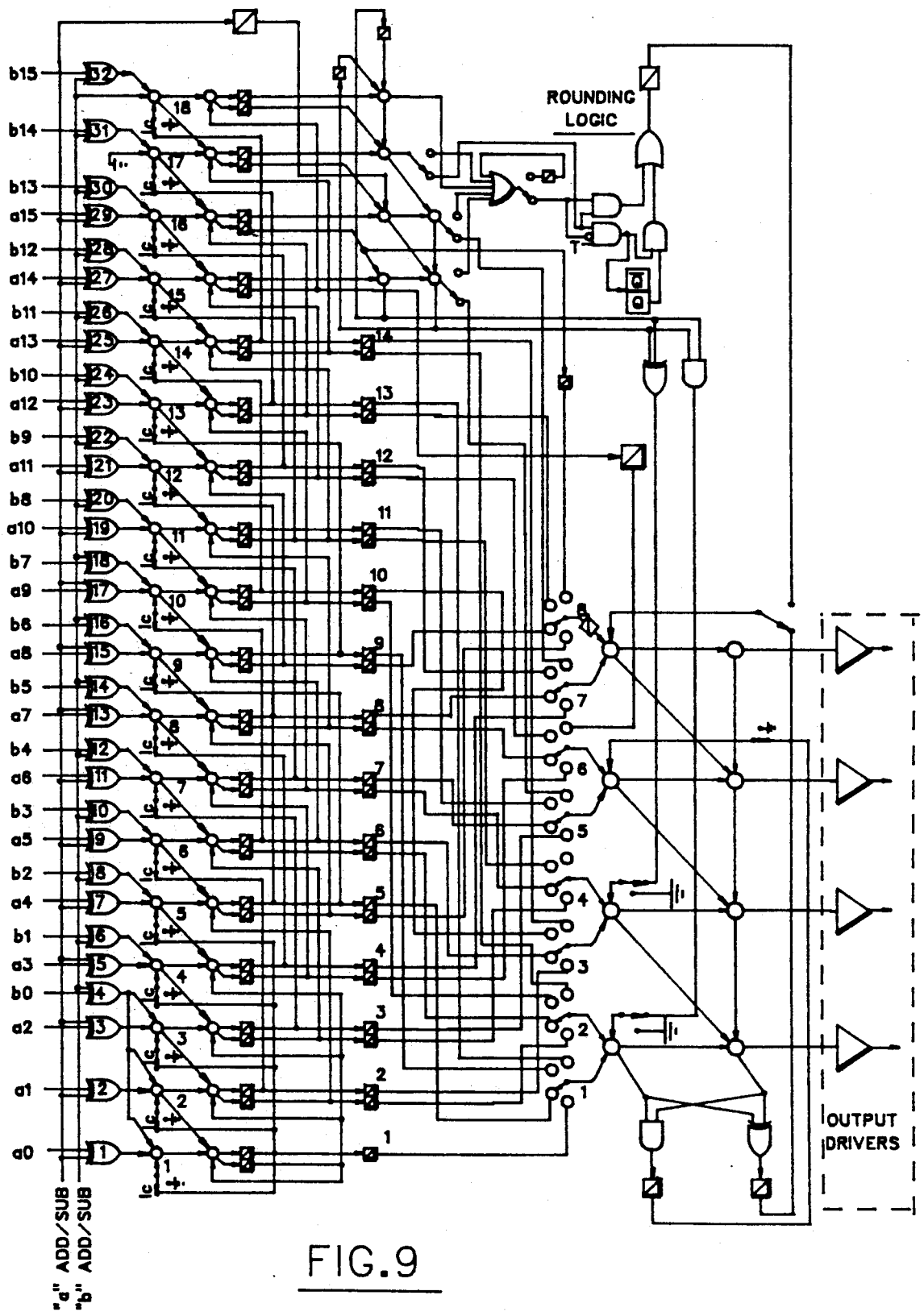
FIG. 9 is a more detailed diagram of the accumulator structure for connection to the outputs of the table-lookup memories as shown in FIG. 8.

An example of an appropriate accumulator layout is shown in more detail in FIG. 9.

Multiple Window Operators

The structure just described in connection with FIG. 4 is for a single, separate window operator for each FFT output to be windowed. If only one window operator per channel were used, 64 window operators would be required for a 64-channel configuration. But, if multiple FFT outputs are to be windowed, the invention permits 2 or 4 adjacent FFT outputs to be windowed with a minimum of additional input or output pins, and with a minimum of associated hardware. Combining pairs of adjacent frequency bins into a combined windowing device results in 32 windowing devices being required for the 64 frequency bins (channels). If four adjacent frequency bins are placed together on a windowing device, only sixteen windowing devices are required for a 64-channel configuration. But, the memory requirements for the table-lookup RAMs is increased.

Figure 5:
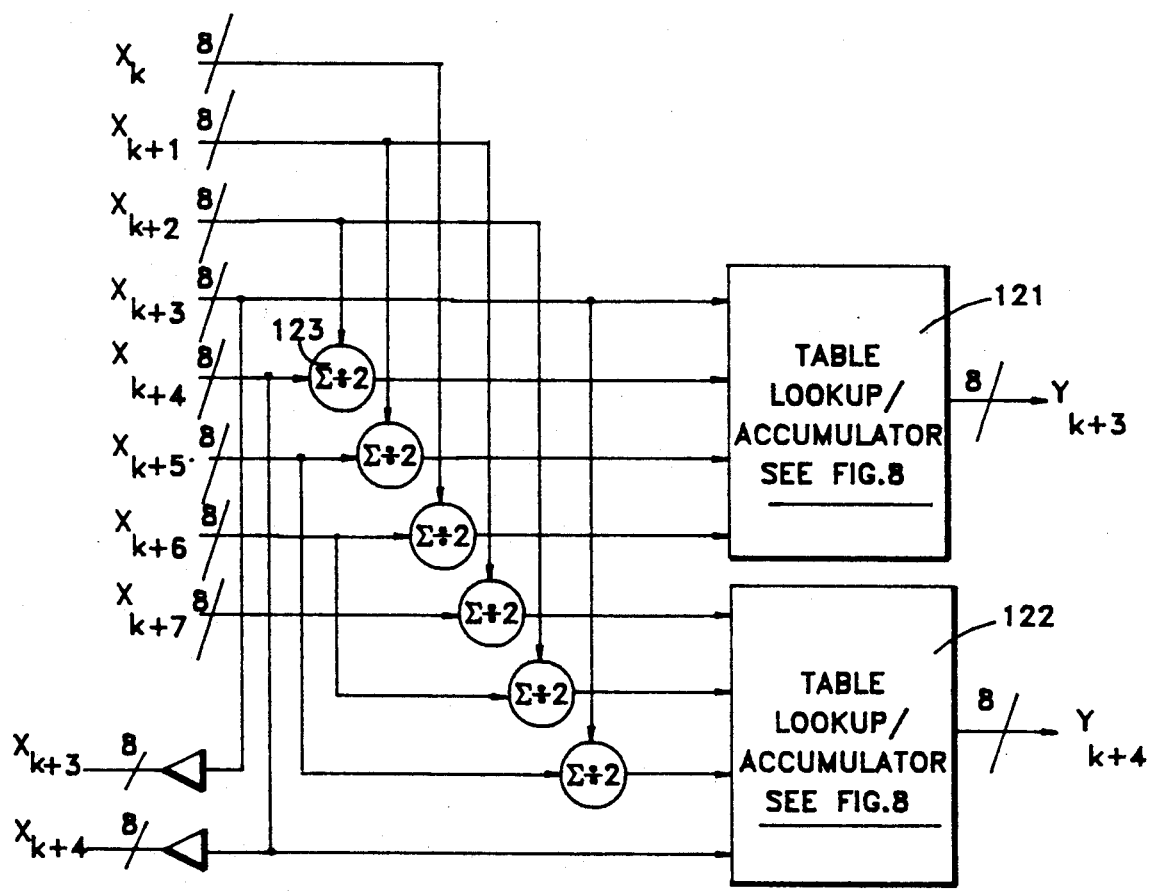
FIG. 5 is a block diagram of two adjacent frequency-domain window operators constructed according to the invention.

FIG. 5 illustrates a device suitable for providing windowing of eight adjacent frequency bins, (FFT outputs $X_k$ through $X_{k+7}$) to provide windowed outputs $Y_{k+3}$ and $Y_{k+4}$. Each of the two FFT outputs/window-operator inputs $X_{k+3}$ and $X_{k+4}$ are applied directly to their own DA lookup-table circuits 121, 122, but are also used as the adjacent inputs for averaging in the addressing for the other's DA lookup table. Thus, a device for providing two adjacent window operators may be constructed using only one additional input line over that required for a single window operator.

As with the single window operator illustrated earlier, the FFT output $X_{k+3}$ is applied to the first distributed-arithmetic table-lookup device 121 along with the paired and averaged adjacent FFT outputs $X_{k+2}$ and $X_{k+4}$; $X_{k+1}$ and $X_{k+5}$; and $X_k$ and $X_{k+6}$. Similarly, the FFT output $X_{k+4}$ is tapped off prior to its complex adder divider 123 and applied to the table-lookup device 122 for it, along with its respective adjacent paired and averaged outputs, namely, the outputs $X_{k+3}$ and $X_{k+5}$; $X_{k+2}$ and $X_{k+6}$; and $X_{k+1}$ and $X_{k+7}$.

Figure 6:
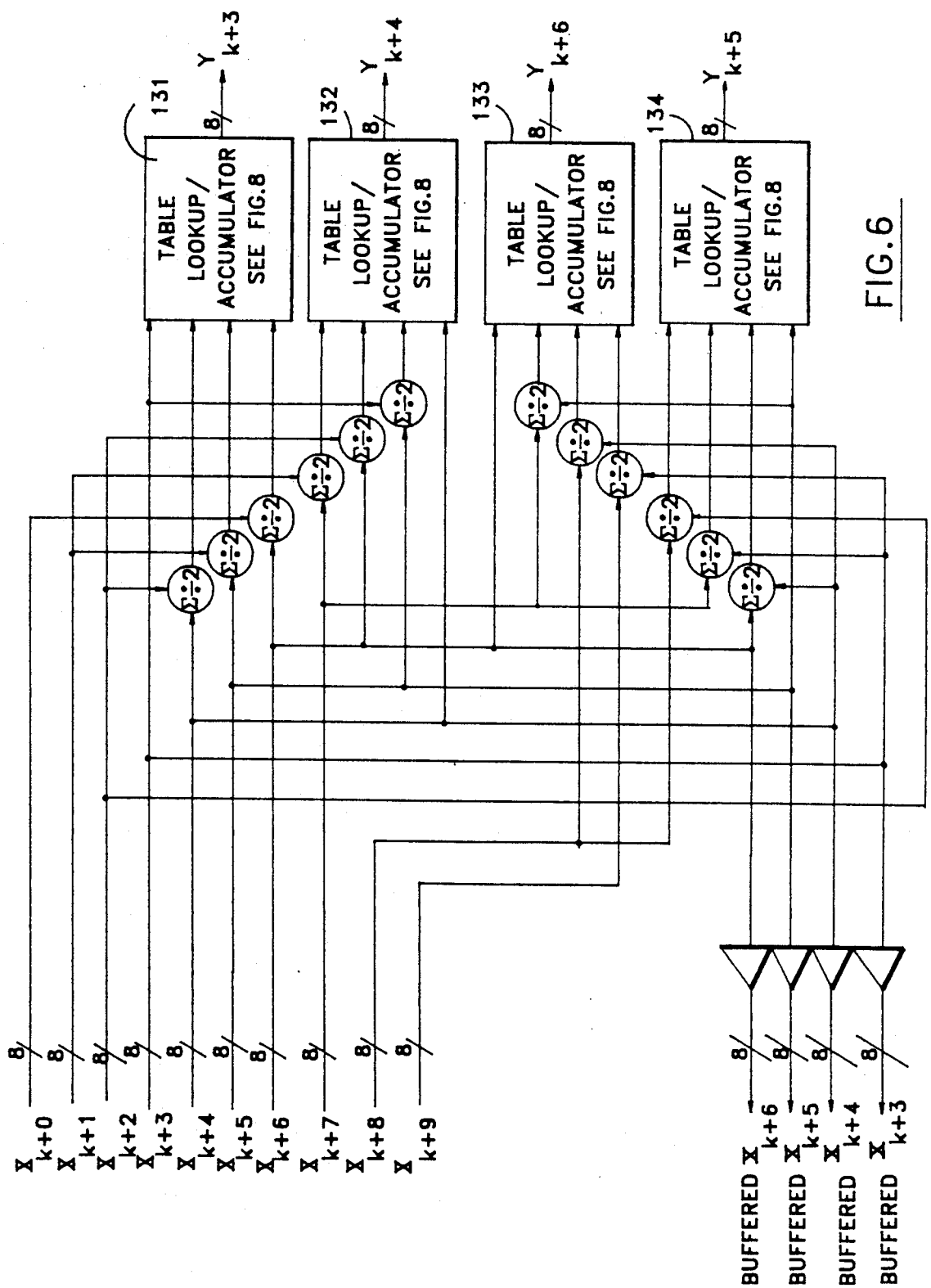
FIG. 6 is a block diagram of four adjacent frequency-domain window operators constructed according to the invention.

FIG. 6 illustrates a system in which 4 adjacent frequency FFT outputs are windowed in the same device, using four table-lookup devices 131–134, each of which is as shown in FIG. 4. The various combinations of the adjacent bins of FFT outputs are averaged using the complex adder dividers shown in FIG. 7. Additionally, the buffered outputs are provided for use in other window operators in the system. Four windowed outputs are obtained with only three more inputs than with the single window operator.

As can be seen by comparing FIGS. 4, 5, and 6, the system of the invention allows an additional windowed output to be provided while only requiring one additional input. This is obtained at the cost of greater memory requirements in the window operator device. The tradeoff is illustrated in the following table:

TABLE 1

| Number of Windowing Operators | Number of Windowing Devices | Number of Front End Inputs | Number of Front End Outputs | Number of Back End Outputs | Total No. of Signal Pins | Memory Size KBITS |
|---|---|---|---|---|---|---|
| 1 | 64 | 56 | 8 | 8 | 72 | 8 |
| 2 | 32 | 64 | 16 | 16 | 96 | 16 |
| 4 | 16 | 80 | 32 | 32 | 144 | 32 |

I claim:

1. A frequency domain Fast Fourier Transform windowing structure for connection to the output terminals of a Fast Fourier Transform structure, comprising:

a first plurality of addressing means, each said addressing means for receiving from a corresponding one of a first plurality of FFT frequency bin outputs a complex input number and for outputting said complex number a second plurality of real bits and a second plurality of imaginary bits per clock period over a third plurality of clock periods;

memory having address terminals connected to the output of said addressing mans, said memory having stored in it distributed arithmetic partial products for performing a windowing function on said complex input numbers ad addressed by said real bits and said imaginary bits, said memory additionally having a real memory output terminal and an imaginary output terminal; and an accumulator connected to said memory output terminals for accumulating said partial products from said memory over said third plurality of clock periods, said accumulator having a real output terminal and an imaginary output terminal.

2. The frequency domain Fast Fourier Transform windowing structure of claim 1, wherein said second plurality of real bits consists of four bits, and said second plurality of imaginary bits consists of four bits.

3. The frequency domain Fast Fourier Transform windowing structure of claim 2, wherein said complex input number consists of sixteen real bits and sixteen imaginary bits, and said third plurality of clock periods consists of four clock periods.

4. A frequency domain Fast Fourier Transform windowing structure for connection to the output terminals of a Fast Fourier Transform structure, comprising:
   a first plurality of addressing means, each said addressing means for receiving from a corresponding one of a first plurality of FFT frequency bin outputs a complex input number and for outputting said complex number a second plurality of real bits and a second plurality of imaginary bits per clock period over a third plurality of clock periods;
   memory having address terminals connected to the output of said addressing means, said memory having stored in it distributed arithmetic partial products for performing a windowing function on said complex input numbers as addressed by said real bits and said imaginary bits, said memory additionally having a real memory output terminal and an imaginary output terminal; and
   an accumulator connected to said memory output terminals for accumulating said partial products from said memory over said third plurality of clock periods, said accumulator having a real output terminal and an imaginary output terminal;
   wherein:
   each of said addressing means includes a real output terminal and an imaginary output terminal;
   said memory includes a real memory connected to said addressing means real output terminal and to said real memory output terminal, and having stored in it the distributed arithmetic partial products for said real bits of said input numbers, and an imaginary memory connected to said addressing means imaginary output terminal and to said imaginary memory output terminal, and having stored in it the distributed arithmetic partial products for said imaginary bits of said input numbers.

5. The frequency domain Fast Fourier Transform windowing structure of claim 4, wherein said accumulator comprises a real accumulator connected to said real memory output terminal and an imaginary accumulator connected to said imaginary memory output terminal.

6. The frequency domain Fast Fourier Transform windowing structure of claim 5, additionally comprising a plurality of adder/dividers, each of said adder/dividers having a plurality of input terminals and an output terminal, wherein one of said addressing means is connected to receive complex input numbers from a frequency bin output terminal of said Fast Fourier Transform structure, and the other of said addressing means are connected to the output terminals of said adder/dividers, and wherein the input terminals of each of said adder/dividers are connected to frequency bin output terminals of said Fast Fourier Transform structure receive complex input numbers from a pair of frequency bin outputs of said Fast Fourier Transform structure.

7. A structure for windowing the frequency domain signals received from the output bins of a Fast Fourier Transform structure, comprising:
   addressing means having an output terminal, said addressing means for receiving from the output bins of a Fast Fourier Transform structure a plurality of complex input numbers, and supplying at said output terminal each of said complex input numbers at the rate of four real bits and four imaginary bits per clock period over a plurality of clock periods:
   memory connected to said addressing means output terminal for receiving from said addressing means said plurality of complex input numbers to address said memory, said memory having stored in it distributed arithmetic partial products for said real bits and said imaginary bits, said memory additionally having a real memory output terminal and an imaginary output terminal; and
   an accumulator connected to said memory output terminals for accumulating said partial products from said memory over said plurality of clock periods and having a real output terminal and an imaginary output terminal.

8. The frequency domain Fast Fourier Transform windowing structure of claim 7, wherein said accumulator comprises a real accumulator connected to said real memory output terminal and an imaginary accumulator connected to said imaginary memory output terminal.

9. The frequency domain Fast Fourier Transform windowing structure of claim 8, wherein said input numbers comprise sixteen real bits and sixteen imaginary bits, and said plurality of clock periods comprises four clock periods.

10. A structure for windowing frequency domain signals received from a Fast Fourier Transform structure comprising:
    a plurality of eight-bit address terminals, each comprising:
        a four-bit real address terminal for supplying sixteen real bits of a thirty-two bit complex input number four bits per clock period over four clock periods; and
        a four-bit imaginary address terminal for supplying sixteen imaginary bits of said thirty-two bit complex input number four bits per clock period over four clock periods;
    real memory including real address input terminals connected to said real address terminals, said real memory having stored in it distributed arithmetic partial products for performing a windowing function on said real bits of said complex input number, said real memory additionally including a real memory output terminal;
    imaginary memory including imaginary address input terminals connected to said imaginary address terminals, said imaginary memory having stored in it distributed arithmetic partial products for performing a windowing function on said imaginary input bits of said complex input numbers, said imaginary memory additionally including an imaginary output terminal;
    a real accumulator connected to said real memory output terminal for accumulating said partial products from said memory over said four clock periods, said real accumulator having an output terminal; and
    an imaginary accumulator connected to said imaginary memory output terminal for accumulating said partial products over said four clock periods, said imaginary accumulator having an imaginary output terminal.

11. The frequency domain Fast Fourier Transform windowing structure of claim 10, wherein:
    each of said real address terminals comprises first and second two-bit real address terminals, each configured for supplying two real bits per clock period;

each of said imaginary address terminals comprises first and second two-bit imaginary address terminals, each configured for supplying two imaginary bits per clock period;

said real memory comprises a first real memory having a first real memory output terminal and having memory address input terminals connected to said first real address terminals, and a second real memory having a second real memory output terminal and having memory address input terminals connected to said second real address terminals;

said imaginary memory comprises a first imaginary memory having a first imaginary memory output terminal and having memory address input terminals connected to said first imaginary address terminals, and a second imaginary memory having a second imaginary memory output terminal and having memory address input terminals connected to said second imaginary address terminals;

said real accumulator is connected to said first and second real memory output terminals; and said imaginary accumulator is connected to said first and second imaginary output terminals.

12. The Fast Fourier Transform windowing structure of claim 10, wherein one of said real address terminals and one of said imaginary address terminals are connected to a first output bin of a Fast Fourier Transform structure, and the others of said real and imaginary address terminals are each connected to a pair of output bins of said Fast Fourier Transform structure.

13. The frequency domain Fast Fourier Transform windowing structure of claim 12, wherein said windowing function is the Blackman-Harris window function.

14. A method of performing a Fast Fourier Transform windowing operation on signals output from a Fast Fourier Transform structure, comprising:

receiving a first plurality of digital transform signals, each at the rate of a second plurality of real bits and a second plurality of imaginary bits per clock period over a third plurality of clock periods;

transferring said second plurality of real bits and said second plurality of imaginary bits each clock period to table look-up memory having stored in it distributed arithmetic partial products for performing a windowing function on digital transform signals transferred to said memory;

reading from said memory distributed arithmetic partial products corresponding to said bits transferred to said memory; and accumulating the partial products read from said memory over said third plurality of clock periods.

15. The method of claim 14, wherein said second plurality of real bits consists of four bits, and said second plurality of imaginary bits consists of four bits.

16. The method of claim 15, wherein said complex input number consists of sixteen real bits and sixteen imaginary bits, and said third plurality of clock periods consists of four clock periods.

17. A method of performing a Fast Fourier Transform windowing operation on signals output from a Fast Fourier Transform structure, comprising:

receiving a first plurality of digital transform signals, each at the rate of a second plurality of real bits and a second plurality of imaginary bits per clock period over a third plurality of clock periods, wherein said step of receiving said first plurality of digital transform signals comprises:

receiving a first digital transform signal from a frequency bin output of a Fast Fourier Transform structure;

combining pairs of digital transform signals from Fast Fourier Transform frequency bin outputs in a fifty plurality of adder/dividers to produce a fifth plurality of transform signals, wherein said fifth plurality is less than said first plurality;

transferring said second plurality of real bits and said second plurality of imaginary bits each clock period to table look-up memory having stored in it distributed arithmetic partial products for performing a windowing function on digital transform signals transferred to said memory;

reading from said memory distributed arithmetic partial products corresponding to said bits transferred to said memory; and accumulating the partial products read from said memory over said third plurality of clock periods.

18. The method of claim 17, wherein said fifth plurality is two less than said first plurality.

* * * * *